United States Patent
Nagayama

(10) Patent No.: US 10,261,334 B2
(45) Date of Patent: Apr. 16, 2019

(54) LENS HOLDING FRAME, LENS ASSEMBLY, AND METHOD OF ASSEMBLING THE SAME

(71) Applicant: OLYMPUS CORPORATION, Hachioji-shi, Tokyo (JP)

(72) Inventor: Norimitsu Nagayama, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 42 days.

(21) Appl. No.: 15/476,085

(22) Filed: Mar. 31, 2017

(65) Prior Publication Data

US 2017/0205637 A1 Jul. 20, 2017

Related U.S. Application Data

(63) Continuation of application No. PCT/JP2015/078164, filed on Oct. 5, 2015.

(30) Foreign Application Priority Data

Oct. 28, 2014 (JP) .................................. 2014-219600

(51) Int. Cl.
*G02B 7/02* (2006.01)
*G02B 27/62* (2006.01)
(Continued)

(52) U.S. Cl.
CPC .............. *G02B 27/62* (2013.01); *B29C 65/48* (2013.01); *F16B 11/006* (2013.01); *G02B 7/022* (2013.01);
(Continued)

(58) Field of Classification Search
CPC ......... G02B 27/62; G02B 7/022; G02B 7/025
See application file for complete search history.

(56) References Cited

U.S. PATENT DOCUMENTS 5,249,082 A 9/1993 Newman

FOREIGN PATENT DOCUMENTS

| CN | 102540386 A | 7/2012 |
| JP | 06507739 A | 9/1994 |

(Continued)

OTHER PUBLICATIONS

International Search Report (ISR) and Written Opinion dated Dec. 15, 2015 issued in International Application No. PCT/JP2015/078164.

(Continued)

*Primary Examiner* — Joseph P Martinez
(74) *Attorney, Agent, or Firm* — Holtz, Holtz & Volek PC

(57) ABSTRACT

A lens holding frame includes: a frame portion, a plate-shaped portion, holding portions, and auxiliary holding portions. The frame portion has a tubular shape extending along a reference axis. The plate-shaped portion overhangs inward from an inner circumferential surface of the frame portion. The holding portions protrude at sites of at least three places, which are away from each other in a circumferential direction around the reference axis on a surface of the plate-shaped portion, in a direction along the reference axis and are located on an abutting plane. The auxiliary holding portions protrude from a surface of the plate-shaped portion up to heights at which the auxiliary holding portions do not reach the abutting plane in the same direction as the holding portions.

8 Claims, 9 Drawing Sheets

(51) Int. Cl.
*B29C 65/48* (2006.01)
*F16B 11/00* (2006.01)
*B29L 11/00* (2006.01)

(52) U.S. Cl.
CPC ....... *G02B 7/025* (2013.01); *B29L 2011/0016* (2013.01)

(56) References Cited

FOREIGN PATENT DOCUMENTS

| | | | | |
|---|---|---|---|---|
| JP | 10282388 A | 10/1998 | | |
| JP | 11-149029 | * 6/1999 | .............. | G02B 7/02 |
| JP | 11149029 A | 6/1999 | | |
| JP | 2006113107 A | 4/2006 | | |
| JP | 2008-090290 | * 4/2008 | .............. | G02B 7/02 |
| JP | 2008090290 A | 4/2008 | | |
| JP | 2009139702 A | 6/2009 | | |
| WO | 9220001 A1 | 11/1992 | | |

OTHER PUBLICATIONS

Japanese Office Action dated Sep. 4, 2018 (an English translation thereof) issued in Japanese Application No. 2014-219600.

* cited by examiner

LENS HOLDING FRAME, LENS ASSEMBLY, AND METHOD OF ASSEMBLING THE SAME

CROSS REFERENCE TO RELATED APPLICATIONS

The application is a continuation application based on a PCT Patent Application No. PCT/JP2015/078164, filed Oct. 5, 2015, whose priority is claimed on Japanese Patent Application No. 2014-219600, filed Oct. 28, 2014. The content of both the PCT Application and the Japanese Application are incorporated herein by reference.

BACKGROUND OF THE INVENTION

Field of the Invention

The present invention relates to a lens holding frame, a lens assembly, and a method of assembling the same.

Description of Related Art

Relative positions of lenses need to be within an allowable range so that an optical device obtains necessary optical performance. However, for example, when assembling is performed without adjustment in assembling a lens barrel of a digital camera or the like, allowable processing errors for a lens and a lens holding frame may exceed the processing limit in some cases.

For this reason, a lens holding frame is assembled while the eccentricity of the lens is adjusted so that optical performance of a lens assembly is secured.

As technology associated with this, for example, Japanese Unexamined Patent Application, First Publication No. H10-282388 discloses a lens holding structure. In the lens holding structure, a lens is accommodated in a lens frame having an inner diameter larger than an outer diameter of the lens. The position of the lens can be adjusted in a radial direction in the lens frame.

Also, a position of the lens in a direction along an optical axis thereof may be adjusted in some cases. In this case, the lens abuts a lens holding portion located at a predetermined plane so that a posture of the lens is determined. For example, an actuator including an adsorption cylinder configured to adsorb a lens adsorbs the lens. The actuator moves the lens in parallel so that a position of the lens is adjusted. When the position of the lens has been adjusted, for example, the lens is adhered to the lens holding frame using an adhesive or the like, and thus the position of the lens is fixed.

SUMMARY OF THE INVENTION

A lens holding frame of a first aspect of the present invention includes: a tubular frame portion configured to accommodate a lens therein and extending along a reference axis such that an outer circumference portion of the lens is adhered thereto; a plate-shaped portion which is provided in the frame portion to overhang inward from an inner circumferential surface of the frame portion; holding portions on a surface of the plate-shaped portion protruding at sites of at least three places, which are spaced with each other in a circumferential direction around the reference axis, in a direction along the reference axis and located on an abutting plane used to define a posture of the lens; and auxiliary holding portions protruding from a surface of the plate-shaped portion up to heights at which the auxiliary holding portions do not reach the abutting plane in the same direction as the holding portions.

According to a second aspect of the present invention, in the first aspect, at least one of the auxiliary holding portions may be formed between the holding portions adjacent to each other in the circumferential direction.

According to a third aspect of the present invention, in the first aspect, the auxiliary holding portions may be formed at positions at which portions between the holding portions adjacent to each other in the circumferential direction are equally divided into two portions in the circumferential direction.

According to a fourth aspect of the present invention, in the first aspect, the holding portions may be provided at equal intervals in the circumferential direction.

According to a fifth aspect of the present invention, in the first aspect, three holding portions and three auxiliary holding portions may be formed.

A lens assembly of a sixth aspect of the present invention includes: the lens holding frame according to any one of first to fifth aspects; and a lens adhered and fixed to the lens holding frame at position away from the holding portions and the auxiliary holding portions of the lens holding frame.

A method of assembling a lens assembly of a seventh aspect of the present invention includes: performing temporarily placement in which a lens is disposed above the holding portions in the lens holding frame according to any one of first to fifth aspects; pushing an adsorption cylinder on which the lens is adsorbed against the lens; restricting a change in posture of the lens by regulating the amount of rotation of the lens using the auxiliary holding portions if the lens rotates about an axis crossing the reference axis of the lens holding frame when the adsorption cylinder is pushed against the lens; adsorbing the lens of which the posture is fixed such that the lens is brought into contact with three places or more of the holding portions and the auxiliary holding portions; and moving the adsorbed lens in at least a direction along the reference axis and adhering the lens to the lens holding frame in a state in which the lens is away from both of the holding portions and the auxiliary holding portions.

According to the method of assembling the lens assembly of an eighth aspect of the present invention, in the seventh aspect, a convex surface which is convex toward the adsorption cylinder may be formed at a surface of the lens against which the adsorption cylinder is pushed.

According to the method of assembling the lens assembly of a ninth aspect of the present invention, in the seventh aspect, if the lens is in contact with the auxiliary holding portions when a change in posture of the lens is restricted, the lens is moved due to a bell clamp action in the radial direction and the adsorption cylinder may be pushed until the lens is in contact with only the holding portions, and when the lens is adsorbed, the lens may be in contact with three places or more of the holding portions and the lens of which a posture is fixed may be adsorbed.

DETAILED DESCRIPTION OF THE PREFERRED EMBODIMENTS

Hereinafter, an embodiment in accordance with the present invention will be described with reference to the accompanying drawings.

A lens assembly of this embodiment will be described.

Figure 1:
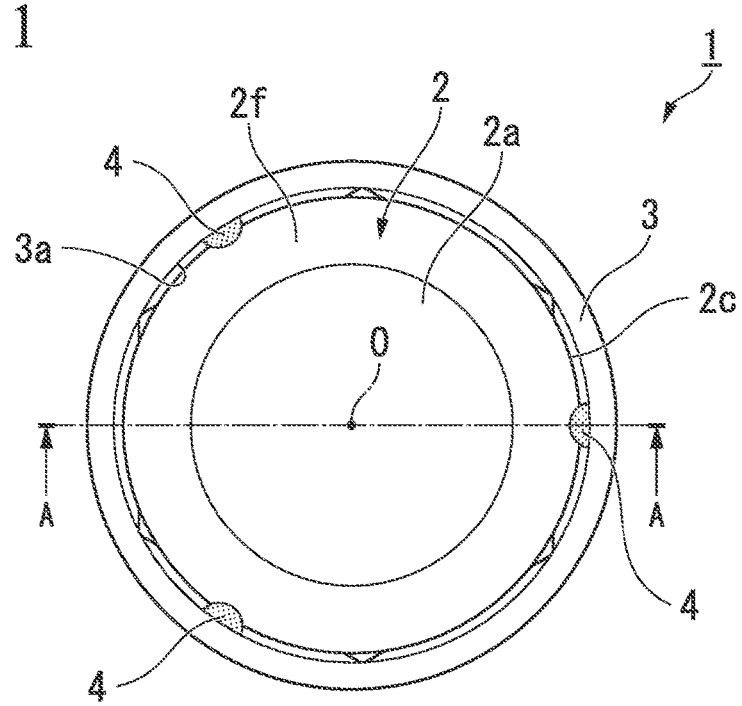
FIG. 1 is a schematic plan view showing an example of a lens assembly of an embodiment of the present invention.
Figure 2:
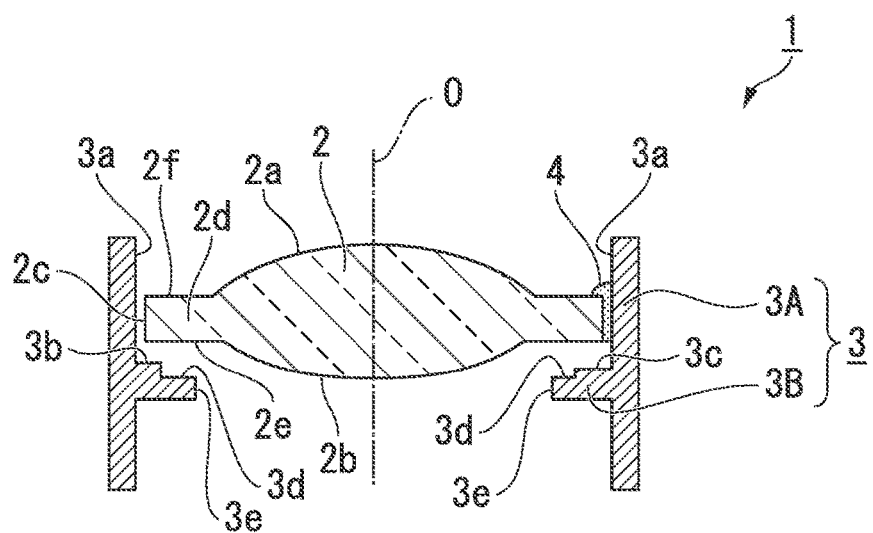
FIG. 2 is a cross-sectional view taken along line A-A in FIG. 1.
Figure 3:
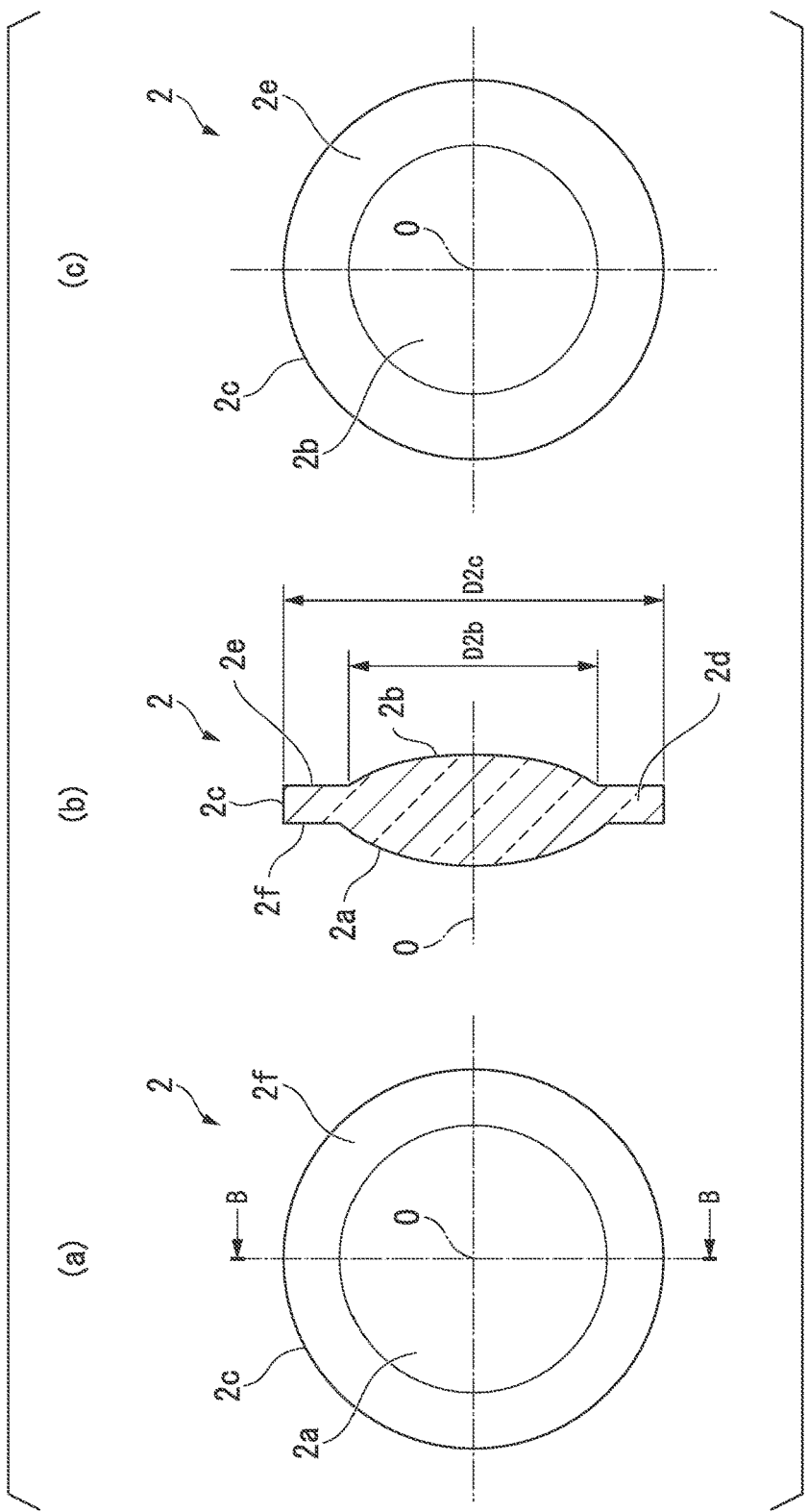
FIG. 3 is a schematic plan view showing an example of lenses used for a lens assembly of an embodiment of the present invention, a cross-sectional view taken along line B-B, and a rear view thereof, respectively.
Figure 4:
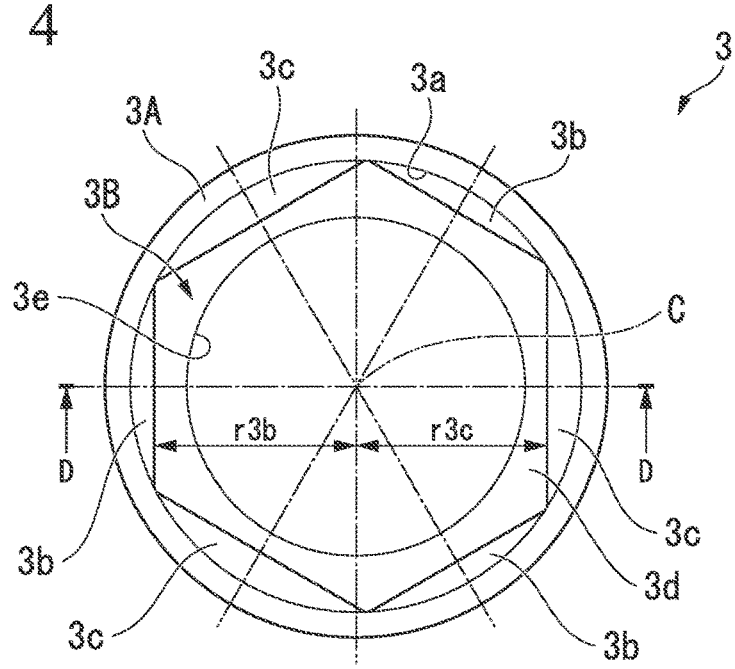
FIG. 4 is a schematic plan view showing an example of a lens holding frame of an embodiment of the present invention.
Figure 5:
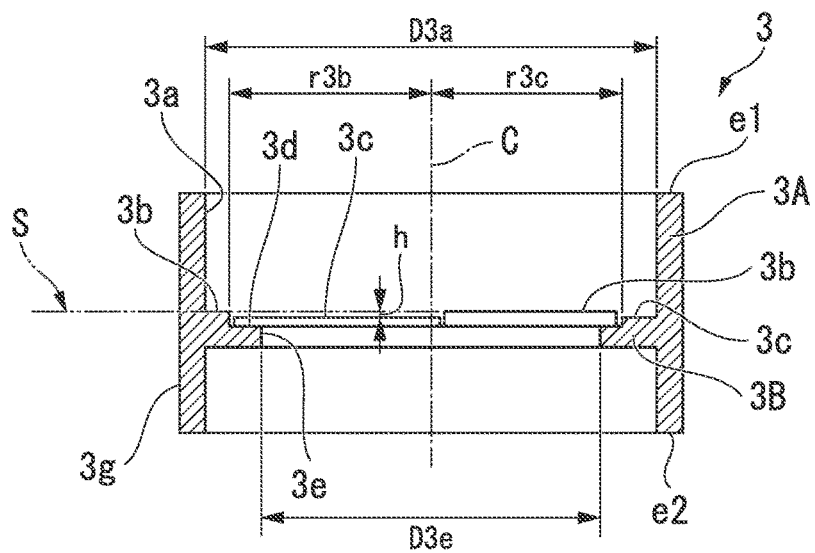
FIG. 5 is a cross-sectional view taken along line D-D in FIG. 4.

FIG. 1 is a schematic plan view showing an example of a lens assembly of an embodiment of the present invention. FIG. 2 is a cross-sectional view taken along line A-A in FIG. 1. FIG. 3 (a) is a schematic plan view showing an example of lenses used for a lens assembly of an embodiment of the present invention. FIG. 3 (b) is a cross-sectional view taken along line B-B in FIG. 3 (a). FIG. 3 (c) is a schematic rear view showing the example of the lenses used for the lens assembly of the embodiment of the present invention. FIG. 4 is a schematic plan view showing an example of a lens holding frame of an embodiment of the present invention. FIG. 5 is a cross-sectional view taken along line D-D in FIG. 4.

As shown in FIGS. 1 and 2, a lens unit 1 of this embodiment is configured such that the lens 2 is inserted into a lens holding frame 3. The lens unit 1 is a lens assembly assembled using a method of assembling the lens assembly of this embodiment.

Here, "the lens assembly" refers to a united assembly in which a lens is fixed to a lens holding frame. The lens assembly may be a form in which the lens assembly itself constitutes a product such as, for example, an interchangeable lens. The lens assembly may be a semi-finished product of an interchangeable unit or the like constituting a portion of a product. The lens assembly may be a partial assembly appearing only in a method of manufacturing a product. For example, when a group of moving lenses and a group of fixed lenses are fixed to separate lens holding frames in a zoom lens, a barrel unit including the group of moving lenses and a barrel unit of the a group of fixed lenses constitute lens assemblies.

The lens unit 1 can include a plurality of lenses. Hereinafter, a case in which the lens unit 1 has only the lens 2 will be described below as an exemplary example.

In this specification, when relative positions associated with members with a shape which is shaft-like, tubular, or the like in which an axis such as an optical axis and a central axis can be specified are explained, an axial direction, a circumferential direction, and a radial direction may be used in some cases. The axial direction is a direction along the axis. The circumferential direction is a direction around the axis. The radial direction is a direction along a line crossing the axis on a plane orthogonal to the axis. A direction along the optical axis may be referred to as an optical axial direction in some cases. In the radial direction, a position away from the axis may be referred to as being at an outer side in a radial direction and a position close to the axis may be referred to as being at an inner side in a radial direction in some cases.

As shown in FIG. 3, the lens 2 is a single lens having a first lens surface 2a and a second lens surface 2b. The lens 2 has a disc-shaped flange portion 2d extending along an outer circumference of the first lens surface 2a and the second lens surface 2b (refer to FIG. 3 (b)).

The shapes of the first lens surface 2a and the second lens surface 2b are not particularly limited. For example, the shapes of the first lens surface 2a and the second lens surface 2b may be surface shapes such as spherical surfaces, aspheric surfaces, free-form surfaces, planes, or the like.

The first lens surface 2a and the second lens surface 2b may be convex surfaces. The first lens surface 2a and the second lens surface 2b may be concave surfaces. Any one of the first lens surface 2a and the second lens surface 2b may be a plane.

For example, a case in which the lens 2 is a biconvex lens in which the first lens surface 2a and the second lens surface 2b are formed as convex spherical surfaces is an exemplary example and will be described below.

A lens lateral surface 2c (an outer circumference portion of the lens) serving as an outer circumferential surface of the flange portion 2d is formed as a cylindrical surface coaxial with a lens optical axis O of the first lens surface 2a and the second lens surface 2b.

In the flange portion 2d, a flange surface 2f connected to an outer edge of the first lens surface 2a and a lens reference surface 2e connected to an outer edge of the second lens surface 2b are formed as planes orthogonal to the lens optical axis O.

The lens reference surface 2e is a reference plane used to determine a position and a posture of the lens 2 in the optical axial direction. The lens reference surface 2e need not be provided throughout the entire circumference as long as the lens reference surface 2e can be used to determine the position and the posture of the lens 2. However, in this embodiment, for example, the lens reference surface 2e is provided throughout the entire circumference.

The lens 2 is manufactured from glass or a synthetic resin. For example, when the lens 2 is made of glass, the lens 2 may be manufactured through polishing of glass, glass molding, or the like. When the lens 2 is made of a synthetic resin, the lens 2 may be manufactured through injection molding or the like.

As shown in FIGS. 1 and 2, the lens holding frame 3 is a tubular member configured to accommodate the lens 2 therein. After the position of the lens 2 is adjusted, the lens 2 is fixed to the lens holding frame 3 at the adjusted position. In the case of position adjustment of the lens 2 in the lens holding frame 3, at least positions thereof in the optical axial direction and the radial direction can be adjusted.

As shown in FIGS. 4 and 5, the lens holding frame 3 includes a frame portion 3A and a plate-shaped portion 3B. The frame portion 3A has a cylindrical shape. The plate-shaped portion 3B has a flat plate shape overhanging inward from an inner circumferential surface $3a$ of the frame portion 3A.

The inner circumferential surface $3a$ and an outer circumferential surface $3g$ (refer to FIG. 5) of the frame portion 3A are formed as cylindrical surfaces along a central axis C (a reference axis).

An inner diameter of the inner circumferential surface $3a$ is larger than an outer diameter of the lens lateral surface $2c$ of the lens 2. The size of the inner diameter of the inner circumferential surface $3a$ is a size in which at least an adjustment tolerance of the lens 2 in the radial direction is provided. For example, when the outer diameter (hereinafter referred to as a "lens outer diameter" in some cases) of the lens lateral surface $2c$ is D2C (refer to FIG. 3 (b) and the adjustment tolerance of the lens 2 in the radial direction is 0 or more and $\Delta$ (here, $\Delta>0$) or less with respect to the central axis C, an inner diameter D$3a$ of the inner circumferential surface $3a$ is D$2c+2\Delta$ or more.

The outer circumferential surface $3g$ is a reference plane used to define a position and a shape of the lens holding frame 3 in the radial direction. In this embodiment, the central axis C is defined by a central axis of the outer circumferential surface $3g$.

The central axis C constitutes the reference axis of the lens unit 1 used to refer to an arrangement posture of the lens optical axis O of the lens 2.

In case of the posture of the lens 2 when designed, the lens optical axis O can also be inclined with respect to the central axis C. However, for example, a description will be provided below under the assumption that the posture of the lens 2 when designed is a posture in which the lens optical axis O is coaxial with the central axis C. In other words, the central axis C coincides with an optical axis of an optical system of the lens unit 1 when designed.

As shown in FIG. 5, a first end surface e1 and a second end surface e2 serving as end surfaces of the frame portion 3A in the axial direction are formed as planes orthogonal to the central axis C.

The first end surface e1 and the second end surface e2 can constitute mounting reference planes of the lens unit 1 in the axial direction.

For example, a description will be provided below under the assumption that the second end surface e2 is the reference plane in the axial direction.

The plate-shaped portion 3B is formed at an intermediate portion of the frame portion 3A in the axial direction. When the plate-shaped portion 3B is viewed from the axial direction along the central axis C, the plate-shaped portion 3B is formed as an annular ring about the central axis C (refer to FIG. 4). A circular through hole $3e$ with an inner diameter D$3e$ about the central axis C passes through a central portion of the plate-shaped portion 3B in a thickness direction.

In the plate-shaped portion 3B, the lens 2 is held at a position closer to the second end surface e2 than to a position to be fixed when designed before the lens 2 is fixed to the lens holding frame 3.

In this embodiment, the plate-shaped portion 3B holds the lens reference surface $2e$ of the lens 2. For this reason, when the lens 2 is held at the plate-shaped portion 3B, the inner diameter D$3e$ of the through hole $3e$ has a dimension in which the second lens surface $2b$ is not in contact with an opening of the through hole $3e$. For example, the inner diameter D$3e$ of the through hole $3e$ has a dimension in which D$3e \geq$ D$2b+2\cdot\Delta$ is satisfied. Here, D$2b$ (refer to FIG. 3 (b)) indicates an outer diameter of the second lens surface $2b$ of the lens 2.

A holding portion $3b$ and an auxiliary holding portion $3c$ protruding from the surface $3d$ toward the first end surface e1 in the axial direction are formed in a surface $3d$ of the plate-shaped portion 3B which faces the first end surface e1.

The surface $3d$ is formed as a plane orthogonal to the central axis C. The surface $3d$ extends in a range from an inside of the inner circumferential surface $3a$ to the through hole $3e$.

In this embodiment, an end of the holding portion $3b$ in a protruding direction is a plane. The end of the holding portion $3b$ in the protruding direction is located (aligned) on an abutting plane S used to define the posture of the lens 2. In other words, the abutting plane S coincides with a tangential plane of the end of the holding portion $3b$. As in this embodiment, when the end of the holding portion $3b$ is a plane, the end of the holding portion $3b$ is in surface contact with the abutting plane S (is on the same plane as the abutting plane S).

The abutting plane S is a virtual plane crossing the central axis C at an appropriate angle in accordance with the posture of the lens 2 when designed. In this embodiment, the lens reference surface $2e$ is located on the plane orthogonal to the central axis C when designed. For this reason, the abutting plane S is also a virtual plane orthogonal to the central axis C.

A position of the abutting plane S in a direction along the central axis C is set to an appropriate position at which a distance between the lens reference surface $2e$ at a designed position of the lens 2 in the optical axial direction and the holding portion $3b$ is larger than the adjustment stand of the lens 2 in the optical axial direction.

Three or more holding portions $3b$ may be provided at different places in the circumferential direction. In this embodiment, as shown in FIG. 4, for example, three holding portions $3b$ are provided at places, which are away from each other, centering on positions at which a circumference is equally divided into three portions. The holding portions $3b$ are provided at equal intervals in the circumferential direction.

A shape of the holding portions $3b$ in a plan view is not particularly limited as long as the holding portions $3b$ can hold the lens reference surface $2e$ of the lens 2.

In this embodiment, for example, a shape surrounded by a circular arc of the inner circumferential surface $3a$ and a chord enclosing the circular arc is adopted as the shape of the holding portions $3b$ in the plan view. A distance r$3b$ between an end surface inside the holding portions $3b$ and the central axis C has a dimension smaller than D$2c-$(D$3a/2$). Thus, even if the lens 2 moves in the inner circumferential surface $3a$ in any radial direction, the lens reference surface $2e$ overlaps all of the holding portions $3b$. For this reason, even if the lens 2 moves in the inner circumferential surface $3a$ in any radial direction, the lens 2 is held by the three holding portions $3b$.

Auxiliary holding portions $3c$ are portions protruding from the surface $3d$ up to heights, at which the auxiliary holding portions $3c$ do not reach the abutting plane S, in the same direction as the holding portions 3b. The auxiliary holding portions 3c are located between the abutting plane S and the surface 3d. When the lens reference surface 2e is placed on the holding portions 3b such that the lens reference surface 2e is located on the abutting plane S, a gap is formed between the auxiliary holding portions 3c and the lens reference surface 2e.

The auxiliary holding portions 3c regulate an inclination of the lens 2 when an adsorption cylinder is pushed and adsorbed with respect to the lens 2 placed on the holding portions 3b as will be described later.

A forming position, a shape in a plan view, and a height of a surface of the auxiliary holding portions 3c, and the number of auxiliary holding portions 3c are set to appropriate conditions in which the inclination of the lens 2 can be minimized to be within an allowable range.

In this embodiment, the auxiliary holding portions 3c are provided at places, which are between the holding portions 3b adjacent to each other in the circumferential direction, centering on positions at which the circumference is equally divided into two portions. Furthermore, the shape in the plan view of the auxiliary holding portions 3c is a shape surrounded by a circular arc of the inner circumferential surface 3a and a string pulled to the circular arc.

The auxiliary holding portions 3c are located on a plane parallel to the abutting plane S.

The shape in the plan view of the auxiliary holding portions 3c may be the same shape as the holding portions 3b. Here, in this embodiment, distances r3c between end surfaces inside the auxiliary holding portions 3c and the central axis C have a dimension smaller than the distance r3b.

For this reason, in this embodiment, an area of the auxiliary holding portions 3c is larger than an area of the holding portions 3b. An end of the auxiliary holding portions 3c in the circumferential direction is located near an end of the holding portions 3b in the circumferential direction.

The height of the surface of the auxiliary holding portions 3c may be set in consideration of the inclination of the lens 2 which can occur when the lens 2 is adsorbed and an inclination allowed for the lens 2.

For example, in this embodiment, an inclination of the lens when the lens reference surface 2e of the lens 2 is in contact with the holding portions 3b adjacent to each other in the circumferential direction and is in contact with the auxiliary holding portion 3c between the adjacent holding portions 3b is set to a dimension in which it is within an allowable range.

In this embodiment, the holding portions 3b are held at positions at which the lens reference surface 2e of the lens 2 is substantially equally divided into three portions in the circumferential direction. For this reason, a support span between the holding portions 3b adjacent in the circumferential direction and the auxiliary holding portion 3c therebetween is set to about D2c/4 so that the inclination of the lens 2 can be simply calculated. In other words, if an allowable inclination is set to $\theta$ and a distance between the auxiliary holding portions 3c and the abutting plane S is set to h, an approximate relationship: $h=(D2c/4)\tan\theta$ is satisfied.

In order to more accurately obtain the relationship between a distance h and an inclination $\theta$, a disposition simulation may be performed on the basis of an actual three-dimensional shape of the lens 2 and the holding portions 3b.

Here, the allowable inclination $\theta$ may have an angle corresponding to or less than an allowable tilt eccentricity of the lens 2 in the lens unit 1. An angle at which a bell clamp action at a time of assembly, which will be described later, acts can be set to an angle larger than an allowable tilt eccentricity.

Whether the bell clamp action acts is different according to a curvature of the first lens surface 2a, a coefficient of friction of an adsorption cylinder 5a with respect to an adsorption portion 5d, which will be described later, coefficients of friction of the lens reference surface 2e with respect to the holding portions 3b and the auxiliary holding portions 3c, a shape of the adsorption portion 5d, or the like. For this reason, the distance h between each of the auxiliary holding portions 3c and the abutting plane S is preferably set through a test, a simulation, or the like which has been performed in advance. The bell clamp action may act in some cases as long as the allowable inclination $\theta$ is an angle such as an angle corresponding to or less than the allowable tilt eccentricity of the lens 2.

In this embodiment, a case in which the angle is set to an angle at which the bell clamp action acts has been described as an example.

The lens holding frame 3 with such a constitution may be prepared by molding a synthetic resin using a mold. The lens holding frame 3 may be prepared by cutting a metal.

When the lens holding frame 3 is prepared using synthetic resin molding, there is a concern that warping and the like due to molding shrinkage may arise. However, the holding portions 3b and the auxiliary holding portions 3c of which a relative position needs to be within a predetermined positional accuracy are formed as a portion of the plate-shaped portion 3B. For this reason, a mold is repeatedly modified so that the shape accuracies of sites after molding are within a necessary range.

At this time, in this embodiment, both of the holding portions 3b and the auxiliary holding portions 3c are convex portions having surfaces with shapes in a plan view surrounded by a circular arc of the inner circumferential surface 3a and a string pulled to the circular arc. For this reason, modification may be performed by cutting a core of a mold in a direction along the string. Thus, modification processing is easy.

Next, a method of assembling the lens unit 1 of this embodiment will be described.

Figure 6:
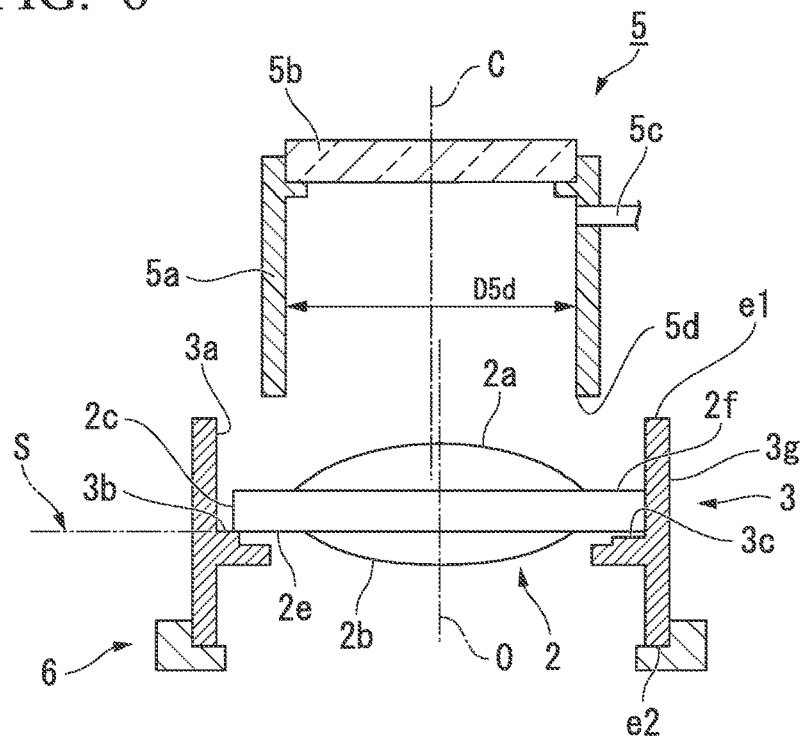
FIG. 6 is a view showing a temporary placing process in a method of assembling a lens assembly of an embodiment of the present invention.
Figure 7:
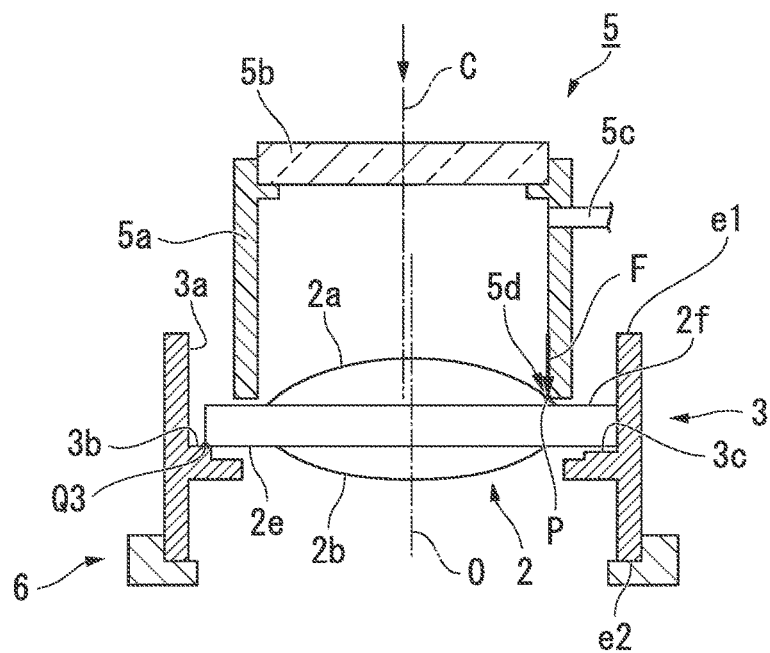
FIG. 7 is a view showing an adsorption cylinder pushing process in the method of assembling the lens assembly of the embodiment of the present invention.
Figure 8:
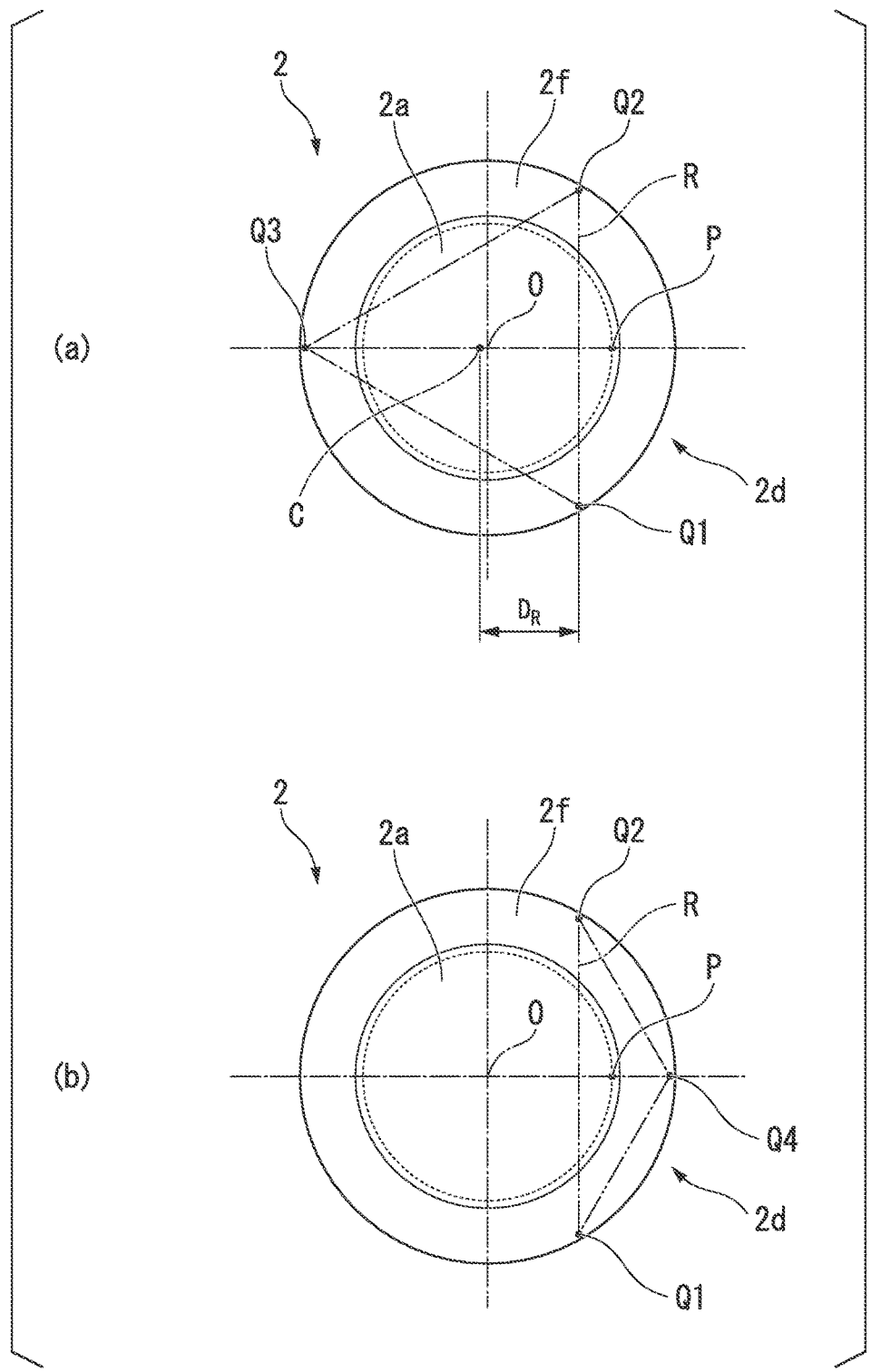
FIG. 8 is a schematic diagram showing an action of a lens holding frame in the embodiment of the present invention.
Figure 9:
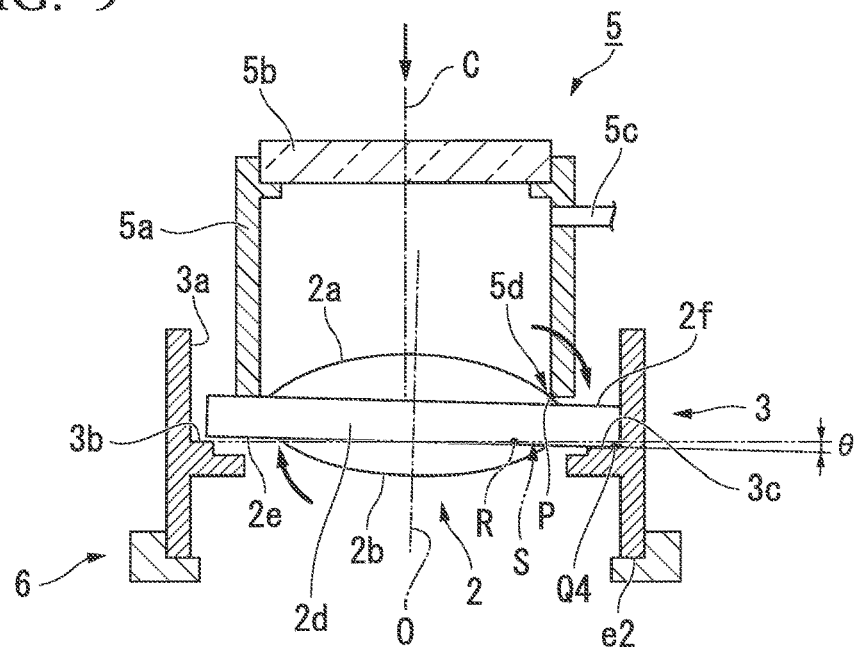
FIG. 9 is a view showing the adsorption cylinder pushing process and a posture regulating process in the method of assembling the lens assembly of the embodiment of the present invention.
Figure 10:
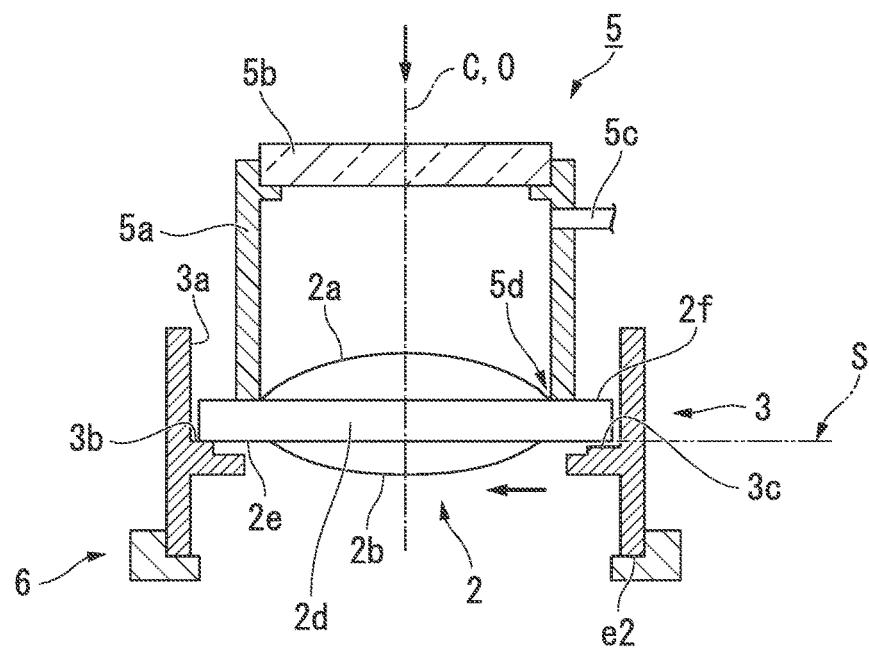
FIG. 10 is a view showing the posture regulating process continuing from FIG. 9.
Figure 11:
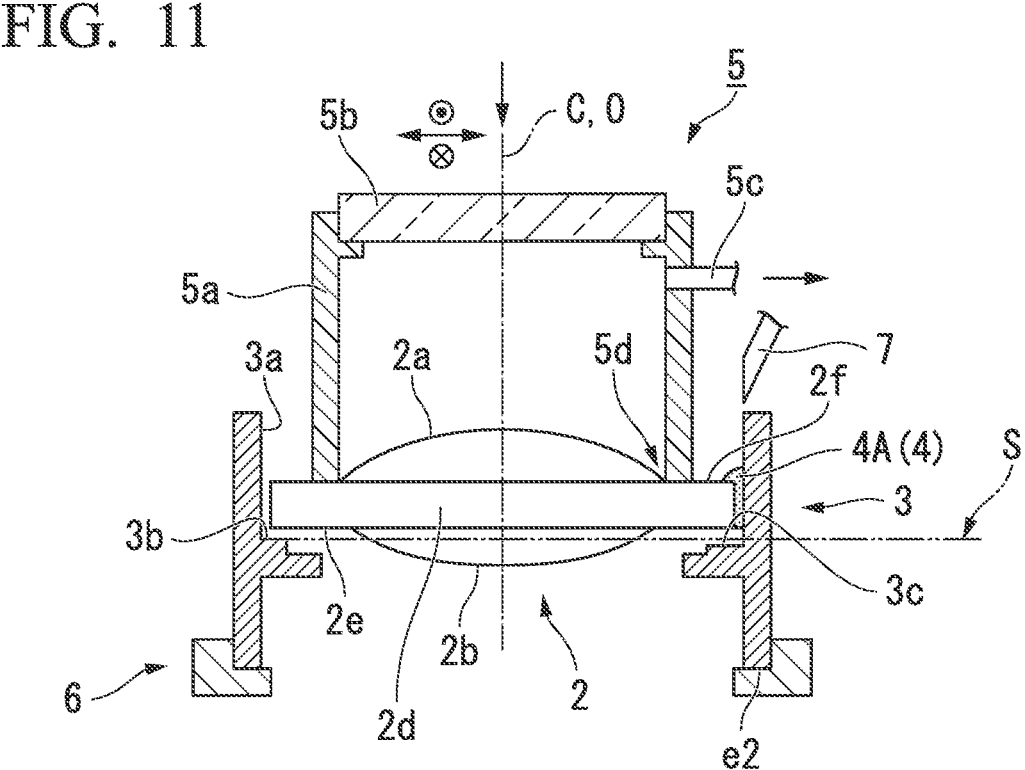
FIG. 11 is a view showing an adsorption step and an adhering step in a method of assembling of a lens assembly of an embodiment of the present invention.

FIG. 6 is a view showing a temporary placing process in the method of assembling the lens assembly of an embodiment of the present invention. FIG. 7 is a view showing an adsorption cylinder pushing process in the method of assembling the lens assembly of the embodiment of the present invention. FIG. 8 is a schematic diagram showing an action of a lens holding frame in the embodiment of the present invention. FIG. 9 is a view showing the adsorption cylinder pushing process and a posture regulating process in the method of assembling the lens assembly of the embodiment of the present invention. FIG. 10 is a view showing the posture regulating process continuing from FIG. 9. FIG. 11 is a view showing an adsorption step and an adhering step in a method of assembling of a lens assembly of an embodiment of the present invention.

The method of assembling the lens assembly of this embodiment includes the temporary placing process, the adsorption cylinder pushing process, the posture regulating process, the adsorption step, and the adhering step.

The temporary placing process is a step of disposing the lens 2 above the holding portions 3b in the lens holding frame 3.

In this step, as shown in FIG. 6, the lens holding frame 3 is disposed at a support stand 6. At this time, the lens holding frame 3 is disposed in a posture in which the first end surface e1 is directed upward. The lens holding frame 3 is aligned at a reference position above the support stand 6 using the second end surface e2 and the outer circumferential surface 3g of the lens holding frame 3 as references in the axial direction and the radial direction.

Subsequently, the lens 2 is disposed such that the lens reference surface 2e is in contact with the holding portions 3b.

Here, the temporary placing process ends.

Since the holding portions 3b are located on the abutting plane S, the lens reference surface 2e is also located on the abutting plane S. Thus, a position of the lens 2 in the axial direction with respect to the lens holding frame 3 and the posture of the lens 2 with respect to the central axis C are determined.

However, the outer diameter of the lens lateral surface 2c of the lens 2 is smaller than the inner diameter of the inner circumferential surface 3a of the lens holding frame 3. Thus, a position of the lens 2 in the radial direction varies within a range of a gap between the lens lateral surface 2c and the inner circumferential surface 3a.

Subsequently, the adsorption cylinder pushing process is performed. As shown in FIG. 7, this step is a step including pushing the adsorption cylinder 5a used for adsorbing the lens 2 against the lens 2 using the adsorption device 5.

Here, the adsorption device 5 used in this embodiment will be described.

The adsorption device 5 includes the adsorption cylinder 5a and a suction tube 5c.

A lower end of the adsorption cylinder 5a is open. A top plate 5b with light transparency is fitted to an upper end of the adsorption cylinder 5a.

An atmosphere inside the adsorption cylinder 5a is suctioned to the outside through the suction tube 5c. A suction pump (not shown) is connected to the suction tube 5c.

The adsorption device 5 is movably supported by a moving mechanism (not shown) above the support stand 6. The adsorption device 5 can be moved at least in the axial direction and the radial direction of the lens holding frame 3 supported by the support stand 6.

The adsorption portion 5d having a circular opening used for adsorbing an upper surface of the lens 2 is formed at the lower end of the adsorption cylinder 5a.

An outer diameter of the adsorption cylinder 5a is smaller than that of the lens lateral surface 2c such that the lens 2 can be adsorbed and moved in the inner circumferential surface 3a.

An inner diameter D5d (refer to FIG. 6) of the adsorption portion 5d preferably has a dimension in which the flange surface 2f can be adsorbed regardless of the position of the lens 2 in the radial direction. For this reason, the inner diameter D5d needs to satisfy D2c>D5d>D2a+2·Δ with D2a as an outer diameter of the first lens surface 2a.

However, in order to reduce the size and manufacturing costs of the lens 2, a difference between the outer diameter D2a and the lens outer diameter D2c of the first lens surface 2a is preferably set to be as small as possible. For this reason, according to a length of the flange portion 2d in the radial direction and a size of A, the inner diameter D5d cannot satisfy the above-described relationship in some cases, for example, because the thickness of the adsorption cylinder 5a is too thin.

In this embodiment, the inner diameter D5d of the adsorption portion 5d is slightly larger than the outer diameter D2a of the first lens surface 2a. For this reason, according to the position of the lens 2 in the radial direction, the adsorption portion 5d has a dimension in which it is in contact with the first lens surface 2a.

Thus, a case in which the lens 2 is adsorbed to the adsorption cylinder 5a in a state in which the adsorption portion 5d is in contact with the first lens surface 2a with a curvature may arise.

When a lens to be adsorbed does not have a flange portion, the lens 2 is adsorbed in a state in which the adsorption portion 5d is in contact with a lens surface with a curvature regardless of the size of the inner diameter D5d.

The top plate 5b is provided to measure an optical performance of the lens unit 1 when the position of the lens 2 is adjusted. For example, measurement light can be incident on the top plate 5b from below the support stand 6 and the measurement light transmitted through the lens 2 can be transmitted upward from the top plate 5b. If a determining sensor (not shown) configured to determine an image-forming position or wavefronts is disposed above the top plate 5b, an image-forming position or wavefronts of the lens unit 1 can be measured using light transmitted through the lens 2. Thus, information regarding the amount of adjustment of the lens 2 can be acquired.

In the adsorption cylinder pushing process using the adsorption device 5, first, as shown in FIG. 6, the adsorption cylinder 5a of the adsorption device 5 is moved above the lens holding frame 3 using the moving mechanism (not shown). At this time, the adsorption cylinder 5a is moved to a position at which a central axis of the adsorption cylinder 5a is coaxial with the central axis C above the lens holding frame 3.

Subsequently, the moving mechanism moves the adsorption cylinder 5a down and pushes the adsorption portion 5d against a surface of the lens 2 which is at the first lens surface 2a side.

At this time, if the lens optical axis O of the lens 2 is at a position coaxial with the central axis C, the adsorption portion 5d is pushed against the flange surface 2f. Thus, the adsorption cylinder pushing process ends.

In this case, the entire adsorption portion 5d is pushed against the flange surface 2f. The flange portion 2d is pressed against the holding portions 3b on which the flange portion 2d is placed. For this reason, the lens reference surface 2e of the lens 2 is located on the abutting plane S.

However, in the temporary placing process, a position of the lens 2 may be shifted in the radial direction in some cases. In this case, as shown in FIG. 7, a portion of the adsorption portion 5d is in contact with the first lens surface 2a serving as a convex surface directed to the adsorption cylinder 5a side and other portions are pushed in a state in which they are away from the lens 2 according to the amount of shift.

In this case, the adsorption portion 5d is in contact with a point P near the outer edge of the first lens surface 2a. A downward force F acts at the point P of the lens 2.

As shown in FIG. 8 (a), the point P is located outside a region surrounded by three points: support positions Q1, Q2, and Q3 of the holding portions 3b. For this reason, a moment rotating the lens 2 due to the force F acts on the lens 2. The axis of rotation when the lens 2 rotates is an axis R in which the two support positions Q1 and Q2, in which distances between the support positions Q1 and Q2 and the point P are shorter than the distance between the support position Q3 and the point P, are connected. When the circumference is equally divided into three portions by a holding portion 3b as in this embodiment, a distance $D_R$ between the central axis C and the axis R is about ¼ of the lens outer diameter D2c of the lens 2.

As shown in FIG. 9, the lens 2 rotates about the axis R as described above. The flange portion 2d of the rotating lens 2 below the point P sinks and the flange portion 2d thereof above the support position Q3 rises.

However, in this embodiment, the auxiliary holding portions 3c slightly smaller than the abutting plane S are provided between the support positions Q1 and Q2. For this reason, an amount of sinking of the flange portion 2d does not exceed a difference between heights of the holding portions 3b and the auxiliary holding portions 3c.

Therefore, even if the adsorption cylinder 5a is moved further down, as shown in FIG. 9, an inclination of the lens 2 stops at a position at which the lens reference surface 2e is in contact with the auxiliary holding portions 3c.

At this time, as shown in FIG. 8 (b), the flange portion 2d of the lens 2 is supported by three places: the support positions Q1 and Q2 and a position Q4 at which the flange portion 2d is in contact with the auxiliary holding portions 3c.

Here, the adsorption cylinder pushing process when the position of the lens 2 is shifted to some extent in the radial direction ends.

As described above, in this embodiment, when the adsorption cylinder 5a is pushed in the adsorption cylinder pushing process, if the lens 2 is rotated about an axis crossing the central axis C, a change in posture of the lens 2 is restricted by regulating the amount of rotation of the lens 2 using the auxiliary holding portions 3c (the posture regulating process).

The amount of rotation of the lens 2 supported by the support positions Q1 and Q2 and the abutting position Q4 is represented as an inclination θ thereof with respect to the abutting plane S. The inclination θ of the lens 2 can be regulated by appropriately setting the distances h between the auxiliary holding portions 3c and the abutting plane S.

When the allowable inclination θ of the lens 2 due to the auxiliary holding portions 3c is set to the allowable tilt eccentricity or less, even if the lens 2 is pushed against the adsorption cylinder 5a while inclined, the posture of the lens 2 is within an allowable range of tilt eccentricity. Therefore, even if this posture is maintained, optical performance of the lens unit 1 is satisfied. For this reason, in this state, the posture regulating process ends and the process can proceed to the adsorption step which will be described later.

However, in this embodiment, the allowable inclination θ is set to an angle at which the bell clamp action acts. Thus, the posture regulating process continues. In other words, the adsorption cylinder 5a is further pushed against the lens 2 in a state in which the lens reference surface 2e of the lens 2 is in contact with the auxiliary holding portions 3c.

Thus, as shown in FIG. 10, the adsorption portion 5d in contact with the first lens surface 2a slides above the first lens surface 2a and moves further downward, and thus the lens 2 moves inward in the radial direction.

If a cylindrical member is pushed against a rotationally symmetric lens surface, which is movably held in the radial direction, in the axial direction, the fact that the lens surface moves in the radial direction and a central axis of the lens surface becomes aligned with a central axis of the cylindrical member is known as the bell clamp action.

In this embodiment, an inner diameter of the adsorption portion 5d is slightly larger than the outer diameter of the first lens surface 2a. For this reason, as shown in FIG. 10, if the adsorption portion 5d reaches the outer edge of the first lens surface 2a and a distal end of the adsorption cylinder 5a is in close contact with the flange surface 2f, movement of the lens 2 according to the bell clamp action stops.

At this time, in this embodiment, the distal end of the adsorption cylinder 5a is not in contact with the first lens surface 2a. Thus, a central axis of the first lens surface 2a is not aligned with the central axis of the adsorption cylinder 5a in accordance with the bell clamp action. However, in this embodiment, since the position of the lens 2 in the radial direction can be adjusted in the adhering step which will be described later, there is no problem even if the lens 2 is aligned with the central axis of the adsorption cylinder 5a and is shifted in the radial direction in this step.

As described above, the flange surface 2f is uniformly pressed by the distal end (a lower end portion in the drawing) of the adsorption cylinder 5a downward throughout the entire circumference thereof. Thus, the lens reference surface 2e is located on the abutting plane S while in contact with only the holding portions 3b. For this reason, the inclination of the lens 2 when this step starts is eliminated.

If the lens reference surface 2e is in contact with only the holding portions 3b as described above, a position of the adsorption cylinder 5a is fixed. Thus, the posture regulating process in this embodiment ends.

Subsequently, the adsorption step is performed. This step is a step of adsorbing the lens 2 of which the posture is fixed while it is in contact with three or more places on the holding portions 3b and the auxiliary holding portions 3c.

The adsorption device 5 performs suction through the suction tube 5c in a state in which the adsorption cylinder 5a is pushed against the lens 2. Thus, the lens 2 is adsorbed onto the adsorption portion 5d of the adsorption cylinder 5a by reducing an internal pressure of the adsorption cylinder 5a.

Here, the adsorption step ends.

Subsequently, the adhering step is performed. This step is a step of moving the lens 2 adsorbed by the adsorption cylinder 5a at least in a direction along the central axis C and adhering the lens 2 to the lens holding frame 3 in a state in which the lens 2 is away from holding portions 3b and the auxiliary holding portions 3c.

First, as shown in FIG. 111, an operator drives the moving mechanism of the adsorption device 5 and moves the adsorption cylinder 5a having the lens 2 adsorbed thereon to a disposition position when designed which is a predetermined distance away from the abutting plane S.

The operator determines an amount of position shift of the lens 2 by measuring optical performance such as, for example, a focal position or wavefronts and moves the adsorption cylinder 5a in the axial direction as necessary. Thus, the operator minimizes the amount of shift of the disposition position.

Also, the operator determines an amount of position shift of the lens 2 in the radial direction while measuring, for example, a focal position or wavefronts and moves the adsorption cylinder 5a in the radial direction as necessary. Thus, the operator minimizes the amount of shift of the disposition position.

The operator repeatedly performs these position adjustments until predetermined disposition accuracy is obtained and performs positioning of the lens 2 in the lens holding frame 3.

All of the movements of the adsorption cylinder 5a in this step are parallel movements. For this reason, the posture of the lens 2 is kept in a posture defined by the posture regulating process from the previous step to the adsorption step. The lens reference surface 2e is located on the abutting plane S in the posture regulating process in this embodiment.

Thus, the lens reference surface 2e of the lens 2 is kept in a posture parallel to the abutting plane S.

When the position of the lens 2 is determined, the operator applies an adhesive 4A between the lens lateral surface 2c and the inner circumferential surface 3a using a syringe 7. The application position and the amount of application of the adhesive 4A may be adopted as long as they are an appropriate application position and the amount of application which are necessary for fixing the lens 2. In this embodiment, for example, as shown by a position of an adhesive cured body 4 in FIG. 1, the adhesive 4A is applied to three places above the auxiliary holding portions 3c.

When the adhesive 4A has been applied, the adhesive 4A is cured. The adhesive 4A is cured so that the adhesive cured body 4 is formed. Thus, the lens 2 is adhered to the lens holding frame 3 at a position away from the holding portions 3b and the auxiliary holding portions 3c and fixed to the lens holding frame 3.

An appropriate curing method can be used as a method of curing the adhesive 4A according to a type of the adhesive 4A. For example, when the adhesive 4A is an ultraviolet (UV) curable adhesive, UV light is radiated. When the adhesive 4A is a thermosetting adhesive, heating is performed.

When the adhesive cured body 4 has been formed, the operator stops the suction through the suction tube 5c and moves the adsorption cylinder 5a upward by driving the moving mechanism.

As described above, the adhering step ends.

Here, the lens unit 1 shown in FIGS. 1 and 2 is assembled.

According to the lens holding frame 3 of this embodiment, in addition to the holding portions 3b located on the abutting plane S, the auxiliary holding portions 3c are provided. For this reason, even if an external force acts on the lens 2 so that the lens rotates about an axis crossing the central axis C of the lens holding frame 3, the amount of rotation of the lens 2 is restricted to being within an allowable range by the auxiliary holding portions 3c. As a result, the lens reference surface 2e of the lens 2 is pushed toward the holding portions 3b and the auxiliary holding portions 3c so that the lens 2 can be subject to the position adjustment in a state in which the lens 2 is in a good posture.

According to the lens holding frame 3 of this embodiment, the holding portions 3b are formed to be away from each other in the circumferential direction and the auxiliary holding portions 3c are formed between the adjacent holding portions 3b so that an area of a site to be formed with high accuracy decreases. For this reason, processing of the lens holding frame 3 is easier than that when a holding portion with good flatness is formed throughout the entire circumferential direction. When the lens holding frame 3 is formed using molds, molds of the holding portions 3b and the auxiliary holding portions 3c can be modified individually. For this reason, modification of the molds becomes easy, and thus costs and a period of time of mold preparation and can be reduced. Therefore, the lens holding frame 3 can be manufactured at a low cost.

According to the lens unit 1 and the method of assembling the lens unit 1 of this embodiment, the lens 2 is adhered to the lens holding frame 3. Thus, the lens reference surface 2e is pushed against the holding portions 3b so that the posture of the lens 2 is defined with high accuracy, and thus the position of the lens 2 can be adjusted in a state in which the posture of the lens 2 is maintained.

For this reason, when the lens 2 is adsorbed, the lens 2 can be quickly adsorbed without correcting an adsorption position thereof such that the lens 2 is not tilted. After the lens 2 has been adsorbed, the posture of the lens 2 need not be also adjusted. Thus, only the position adjustment may be performed. For this reason, the assembly time can be shortened.

First Modified Example

Next, a lens holding frame of a first modified example of the above-described embodiment will be described.

Figure 12:
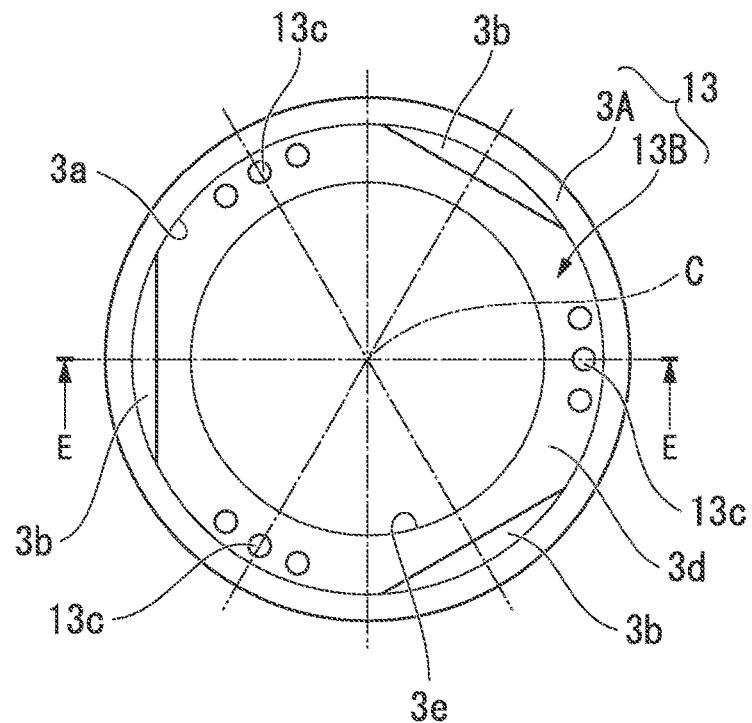
FIG. 12 is a schematic plan view showing an example of a lens holding frame in a first modified example of an embodiment of the present invention.
Figure 13:
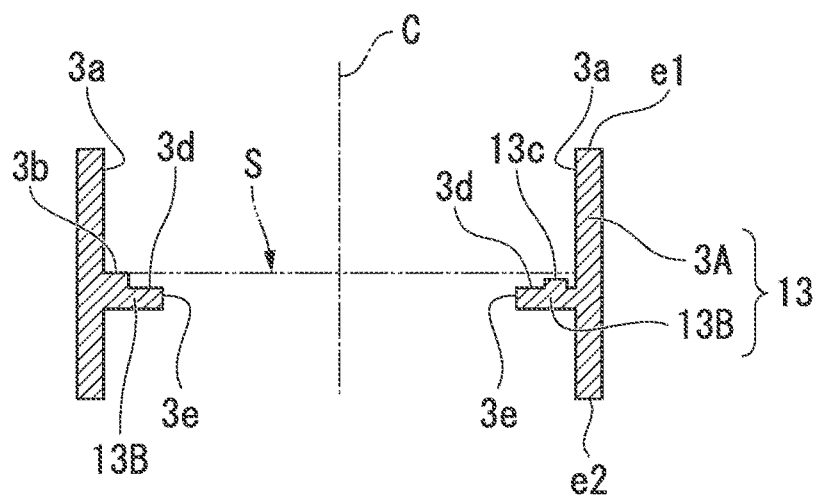
FIG. 13 is a cross-sectional view taken along line E-E in FIG. 12.

FIG. 12 is a schematic plan view showing an example of the lens holding frame in the first modified example of an embodiment of the present invention. FIG. 13 is a cross-sectional view taken along line E-E in FIG. 12.

As shown in FIGS. 12 and 13, a lens holding frame 13 of this modified example includes a plate-shaped portion 13B instead of the plate-shaped portion 3B of the lens holding frame 3 of the above-described embodiment.

The plate-shaped portion 13B includes auxiliary holding portions 13c instead of the auxiliary holding portions 3c of the plate-shaped portion 3B.

The lens holding frame 13 is used instead of the lens holding frame 3 of the lens unit 1 of the above-described embodiment such that a lens assembly of this modified example can be constituted by the lens holding frame 13.

A description will be provided below focusing on differences from the above-described embodiment.

The auxiliary holding portions 13c and the auxiliary holding portions 3c differ in that, while the auxiliary holding portions 3c of the above-described embodiment have shapes in a plan view surrounded by the circular arc of the inner circumferential surface 3a and the string pulled to the circular arc, shapes in a plan view of the auxiliary holding portions 13c have circular shapes and the auxiliary holding portions 13c are away from an inner circumferential surface 3a and in that three auxiliary holding portions 13c are disposed between the adjacent holding portions 3b.

In the auxiliary holding portions 13c which are arranged three at a time, the auxiliary holding portion 13c disposed at a center is provided at a position at which a portion between the adjacent holding portions 3b is equally divided into two portions in the circumferential direction.

In the auxiliary holding portions 13c which are arranged three at a time, the auxiliary holding portions 13c adjacent to the auxiliary holding portion 13c disposed at the center are formed at positions closer to the auxiliary holding portion 13c disposed at the center than to the holding portions 3b adjacent to each other in the circumferential direction.

According to the lens holding frame 13 of this modified example, a lens assembly can be assembled using the same method of assembling the lens assembly as in the above-described embodiment.

At this time, the auxiliary holding portions 13c are not formed near the holding portions 3b in the lens holding frame 13. Thus, the lens holding frame 13 cannot receive a flange portion 2d. However, when a lens 2 is tilted in the adsorption cylinder pushing process, an amount of sinking of the flange portion 2d is the largest at a substantial center (including the case of the center) between the adjacent holding portions 3b.

For this reason, even if the auxiliary holding portions 13c are formed at the positions at which the portion between the adjacent holding portions 3b is equally divided into two portions in the circumferential direction and positions in the vicinity thereof as in this modified example, a posture of the lens 2 can be regulated as in the above-described embodiment.

According to this modified example, an area of the auxiliary holding portions 13c can be reduced compared with the above-described embodiment. Thus, preparation of the lens holding frame 13 becomes easier.

The auxiliary holding portions 13c are circular projections protruding from a surface 3d. When a mold is prepared, the mold can be formed using a core pin. Thus, mold preparation and mold modification become easy.

The plurality of auxiliary holding portions 13c are formed to be away from each other in the circumferential direction. For this reason, even if the auxiliary holding portions 13c can be separately modified and warping of a molded article is complicated, the heights thereof are individually modified so that the mold can be easily modified.

Also, the amount of sinking of the flange portion 2d is smaller when the flange portion 2d is closer to the holding portions 3b. Thus, distances between the auxiliary holding portions 13c and the abutting plane S may be changed in accordance with positions of the auxiliary holding portions 13c in the circumferential direction.

Second Modified Example

Next, a lens holding frame of a second modified example of the above-described embodiment will be described.

Figure 14:
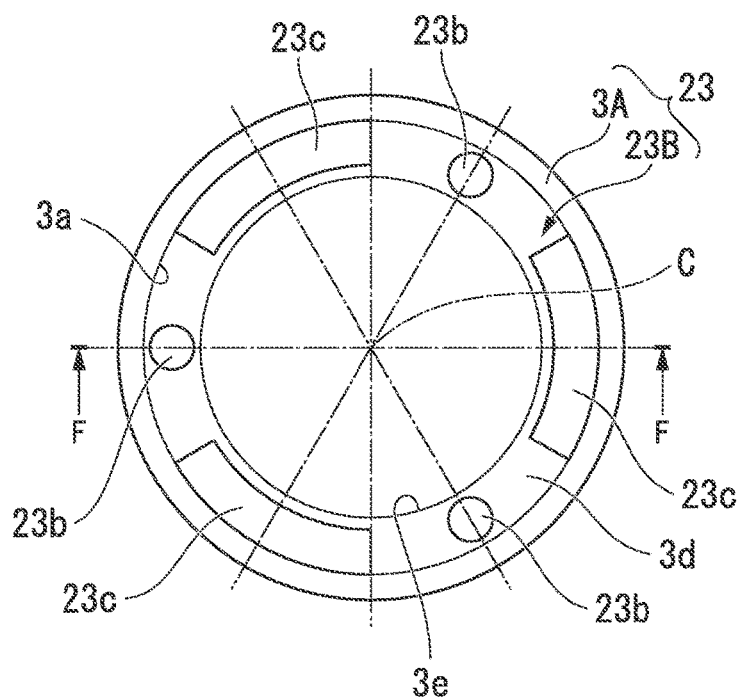
FIG. 14 is a schematic plan view showing an example of a lens holding frame of a second modified example of an embodiment of the present invention.
Figure 15:
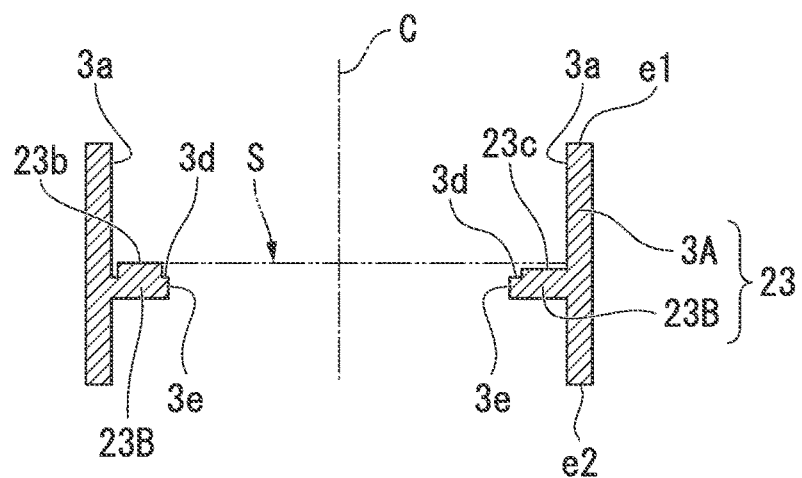
FIG. 15 is a cross-sectional view taken along line F-F in FIG. 14.

FIG. 14 is a schematic plan view showing an example of the lens holding frame of the second modified example of an embodiment of the present invention. FIG. 15 is a cross-sectional view taken along line F-F in FIG. 14.

As shown in FIGS. 14 and 15, a lens holding frame 23 of this modified example includes a plate-shaped portion 23B instead of the plate-shaped portion 3B of the lens holding frame 3 of the above-described embodiment.

The plate-shaped portion 23B includes holding portions 23b and auxiliary holding portions 23c instead of the holding portions 3b and the auxiliary holding portions 3c of the plate-shaped portion 3B.

The lens holding frame 23 is used instead of the lens holding frame 3 of the lens unit 1 of the above-described embodiment such that a lens assembly of this modified example can be constituted by the lens holding frame 23.

A description will be provided below focusing on differences from the above-described embodiment.

The holding portions 23b and the holding portions 3b differ in that, while the holding portions 3b of the above-described embodiment have shapes in a plan view surrounded by the circular arc of the inner circumferential surface 3a and the string pulled to the circular arc, shapes in a plan view of the holding portions 23b have circular shapes and the holding portions 23b are away from an inner circumferential surface 3a.

The holding portions 23b are provided at positions at which portions between the adjacent auxiliary holding portions 23c, which will be described later, are equally divided into two portions in the circumferential direction.

The auxiliary holding portions 23c and the auxiliary holding portions 3c differ in that, while the auxiliary holding portions 3c of the above-described embodiment have shapes in a plan view surrounded by the circular arc of the inner circumferential surface 3a and the string pulled to the circular arc, shapes in the plan view of the auxiliary holding portions 23c have belt shapes extending in circular arc shapes along the inner circumferential surface 3a.

The auxiliary holding portions 23c are provided at positions at which portions between the adjacent holding portions 23b are equally divided into two portions, and the sizes of gaps between the adjacent holding portions 23b are the same.

According to the lens holding frame 23 of this modified example, a lens assembly can be assembled using the same method of assembling the lens assembly as in the above-described embodiment.

At this time, the holding portions 23b configured to define the abutting plane S are formed as circular projections in the plan view. Thus, the lens reference surface 2e is held under a condition closer to a point acceptance than in the above-described embodiment. For this reason, variation due to processing error is reduced, and thus the abutting plane S is defined with higher accuracy.

When the lens holding frame 23 is prepared using a mold, the lens holding frame 23 can be formed using a core pin as in the auxiliary holding portions 13c of the first modified example. Thus, mold preparation and mold modification become easy.

A processing area of the holding portions 23b is also reduced, and thus mold preparation and mold modification become easier.

The auxiliary holding portions 23c are formed in circular arc belt shapes extending along the inner circumferential surface 3a. Thus, the auxiliary holding portions 23c can be formed focusing on positions at which the flange portion 2d is likely to sink and come into contact with the auxiliary holding portions 23c. In other words, the flange portion 2d is an annular ring. Thus, a site at which the flange portion 2d is likely to sink is limited to a belt-like region of the circular arc shape of the inner circumferential surface 3a. Therefore, according to the above-described shapes of the auxiliary holding portions 23c in a plan view, the auxiliary holding portions 23c can be formed within a necessary range without waste.

According to this modified example, the area of the holding portions 23b can be reduced compared with the above-described embodiment, the auxiliary holding portions 23c can be formed without waste, and thus preparation of the lens holding frame 23 becomes easier.

Note that, although a case in which the lens assembly is constituted by one lens and the lens holding frame has been described as an example in the descriptions of the above-described embodiment and modified examples, the number of lenses may be two or more as long as at least one lens is adhered to the lens holding frame.

Although a case in which the lens is a single lens has been described as an example in the descriptions of the above-described embodiment and a modified example, the lens may be, for example, a cemented lens.

In the descriptions of the above-described embodiment and modified examples, a case in which the adsorption cylinder 5a is continuously pushed against the lens 2 until the lens reference surface 2e is in contact with only the holding portions 3b due to the bell clamp action in the posture regulating process has been described as an example. In this case, the distance h between each of the auxiliary holding portions 3c and the abutting plane S can also be set to be larger than the distance corresponding to an allowable tilt eccentricity. Thus, preparation of the lens holding frame 3 becomes easier.

If an allowable inclination θ is an angle at which the bell clamp action acts, the posture regulating process is more preferably continuously performed until the bell clamp action acts and the adsorption cylinder 5a presses against the flange surface 2f throughout the entire circumference thereof even if the allowable inclination θ is set to be the allowable tilt eccentricity or less. In this case, the posture of the lens 2 is regulated with a high level of accuracy.

However, as described in the description of the above-described embodiment, the posture regulating process may end in a state in which the auxiliary holding portions 3c is formed such that the allowable inclination θ of the lens 2 due to the auxiliary holding portions 3c is the allowable tilt eccentricity or less and the lens reference surface 2e is in contact with the auxiliary holding portions 3c and is further tilted than the abutting plane S.

In this case, the adsorption cylinder 5a may not be pushed until the bell clamp action acts. Thus, a load when the adsorption cylinder 5a is pushed against the lens 2 is reduced.

Even if the bell clamp action does not readily act due to a shape of the first lens surface 2a, a material of the adsorption cylinder 5a, or the like, the posture of the lens is held with high accuracy while the lens is assembled.

Although a case in which the lens has the flange portion has been described as an example in the descriptions of the above-described embodiment and modified examples, it is not essential that the lens has the flange portion.

In other words, the lens may include a reference plane for determining a posture thereof, and the reference plane need not be provided at the flange portion. For example, a lens of which one end surface in the optical axial direction is formed of only a lens surface, and of which the other end surface is formed of the lens surface and a reference plane formed on an outer circumference of the lens surface may be provided. For example, a constitution in which the first lens surface 2a and the flange surface 2f of the lens 2 of the above-described embodiment are substituted with an appropriate lens surface and the lens 2 does not have the flange portion 2d may be set.

As described above, when a side opposite to the reference plane is a lens formed of only the lens surface, an adsorption cylinder is pushed against the lens surface with a curvature. For this reason, if the position of the lens in the radial direction is shifted from a center of the adsorption cylinder, a portion of an adsorption portion is first brought into contact with the lens surface and a moment acts on the lens as in a case in which the flange portion is provided.

The lens assembly of the present invention may be assembled using a plano-convex or plano-concave lens in which an entire first lens surface pushed against the adsorption cylinder is formed as a plane. In this case, the lens is not tilted when pushed as long as the adsorption cylinder is uniformly in contact with the first lens surface. However, also in this case, the adsorption cylinder may be non-uniformly in contact with the first lens surface, and a moment may act, and thus the lens may be inclined in some cases. Thus, even if the first lens surface is a plane, the lens holding frame of the present invention is preferably used.

As a cause of the lens tilting, for example, the adsorption cylinder may be disposed to be tilted with respect to the reference axis (the central axis C) in some cases. There is a shape error for the adsorption portion of the adsorption cylinder. Thus, contact with a plane portion of the lens may be non-uniform in some cases.

In the descriptions of the above-described embodiment and modified examples, as the posture of the lens 2 in the lens unit 1 when designed, a posture in which the lens optical axis O is coaxial with the central axis C is described as an example.

However, the posture of the lens 2 when designed may be a posture in which the lens optical axis O crosses the central axis C. In this case, the abutting plane S at which the holding portion is located is a plane inclined at an angle of inclination other than 90° with respect to the central axis C.

As an example of a case in which such a posture is set, an optical system including the lens unit 1 may be an eccentric optical system when a lens is designed in some cases.

As an example of another case in which such a posture is set, when a constant eccentricity occurs in another optical system combined with the lens unit 1, the lens optical axis O of the lens 2 is eccentrically tilted by a predetermined amount, and thus the eccentricity of the other optical system may be corrected in some cases.

Here, the other optical system combined with the lens unit 1 may be a lens other than the lens 2 when a plurality of lenses are provided in the lens unit 1. The other optical system combined with the lens unit 1 may be a lens of another lens assembly combined with the lens unit 1 and used.

In the descriptions of the above-described embodiment and modified examples, a case in which the circumference of the holding portions is equally divided and the holding portions are provided at equal intervals in the circumferential direction has been described as an example. However, disposition of the holding portions is not limited thereto.

For example, the positions of the holding portions can be positions at which the circumference is not equally divided as long as a polygon in which holding positions at adjacent holding portions are connected surrounds a center of gravity of the lens. It is not essential that intervals between the holding portions away from each other in the circumferential direction are also equal intervals.

In the descriptions of the above-described embodiment and modified examples, a case in which the surface of the end of the holding portion in the protruding direction is a plane has been described as an example. However, it is not essential that the holding portion has a shape, in which the holding portion is in surface contact with the reference plane of the lens, used for determining the posture. For example, the holding portion can also be a shape in which the holding portion is in line contact with or in point contact with the reference plane of the lens. In this case, the fact that the end of the holding portion in the protruding direction is located on the abutting plane S refers to the fact that a portion of the end of the holding portion is in contact with the abutting plane S.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of assembling a lens assembly, the method comprising:

performing temporarily placement in which a lens is disposed above holding portions in a lens holding frame, the lens holding frame including (i) a tubular frame portion configured to accommodate the lens therein and extending along a reference axis, (ii) a plate-shaped portion which is provided in the frame portion to project inward from an inner circumferential surface of the frame portion, (iii) the holding portions, which are provided at least at three places on a surface of the plate-shaped portion, are spaced from each other in a circumferential direction around the reference axis, and protrude from the surface of the plate-shaped portion in a direction along the reference axis to an abutting plane used to define a posture of the lens, and (iv) auxiliary holding portions which protrude from the surface of the plate-shaped portion, in the same direction as the holding portions, to heights at which the auxiliary holding portions do not reach the abutting plane;

pushing an adsorption cylinder against the lens;

restricting a change in posture of the lens by regulating an amount of rotation of the lens using the auxiliary holding portions if the lens rotates about an axis crossing the reference axis of the lens holding frame when the adsorption cylinder is pushed against the lens;

adsorbing the lens by the adsorption cylinder, after the posture of the lens has been fixed such by the lens being brought into contact with three places or more of the holding portions and the auxiliary holding portions; and moving the adsorbed lens in at least a direction along the reference axis and adhering the lens to the lens holding frame in a state in which the lens is away from both of the holding portions and the auxiliary holding portions.

2. The method of assembling the lens assembly according to claim 1, wherein at least one of the auxiliary holding portions is located between two of the holding portions that are adjacent to each other in the circumferential direction.

3. The method of assembling the lens assembly according to claim 1, wherein the auxiliary holding portions are located at positions at which portions between the holding portions adjacent to each other in the circumferential direction are equally divided into two portions in the circumferential direction.

4. The method of assembling the lens assembly according to claim 1, wherein the holding portions are provided at equal intervals in the circumferential direction.

5. The method of assembling the lens assembly according to claim 1, wherein the lens holding frame includes three holding portions and three auxiliary holding portions.

6. The method of assembling the lens assembly according to claim 1, wherein the lens is adhered and fixed to the lens holding frame at position away from the holding portions and the auxiliary holding portions of the lens holding frame.

7. The method of assembling the lens assembly according to claim 1, wherein a convex surface which is convex toward the adsorption cylinder is formed at a surface of the lens against which the adsorption cylinder is pushed.

8. The method of assembling the lens assembly according to claim 1, wherein:

when a change in posture of the lens is restricted, in a case in which the lens is in contact with at least one of the auxiliary holding portions, the lens is moved due to a bell clamp action in a radial direction and the adsorption cylinder is pushed until the lens is in contact with only the holding portions, and when the lens is adsorbed, the lens is in contact with three places or more of the holding portions and the lens of which the posture is fixed is adsorbed.

* * * * *